United States Patent [19]

Lahde

[11] Patent Number: 4,796,470
[45] Date of Patent: Jan. 10, 1989

[54] INDICATING LIQUID FUNNEL

[75] Inventor: Frank U. Lahde, Rochester, Mich.

[73] Assignee: The Alten Corporation, South Bend, Ind.

[21] Appl. No.: 391,521

[22] Filed: Jun. 24, 1982

[51] Int. Cl.⁴ .......................................... G01F 23/30
[52] U.S. Cl. ..................................... 73/294; 116/228; 141/94
[58] Field of Search ............... 73/294, 322.5; 116/228, 116/274; 141/94, 95, 96

[56] References Cited

U.S. PATENT DOCUMENTS

| 721,870 | 3/1903 | Edison | 116/228 |
| 883,289 | 3/1908 | Burg | 73/294 |
| 986,535 | 3/1911 | Adams | 73/294 |
| 2,146,211 | 2/1939 | Hail | 116/228 |
| 2,347,305 | 4/1944 | Walker | 116/274 |
| 2,347,306 | 4/1944 | Walker | 116/274 |
| 2,897,853 | 8/1959 | Anstine | 73/294 |
| 3,270,770 | 9/1966 | Wilson | 73/322.5 |
| 4,248,088 | 2/1981 | McGowan | 73/322.5 |

FOREIGN PATENT DOCUMENTS

| 545777 | 7/1956 | Italy | 116/228 |
| 187966 | 4/1923 | United Kingdom | 116/228 |

Primary Examiner—William A. Cuchlinski, Jr.
Assistant Examiner—Thomas B. Will
Attorney, Agent, or Firm—Thomas J. Dodd

[57] ABSTRACT

An indicating liquid funnel with simple, inexpensive indicating means which responds freely to rise of the liquid level within a container being filled approaching full fill in any operative position of the funnel.

6 Claims, 1 Drawing Sheet

U.S. Patent   Jan. 10, 1989   4,796,470
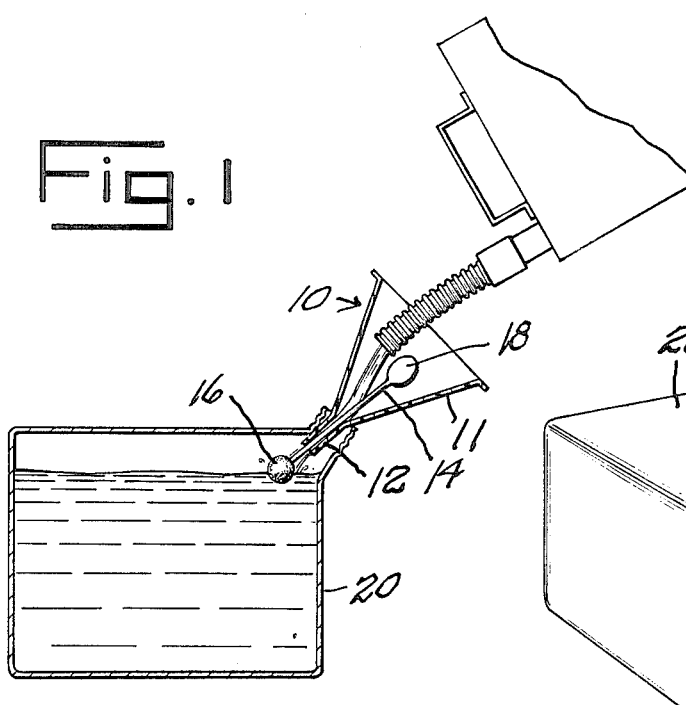
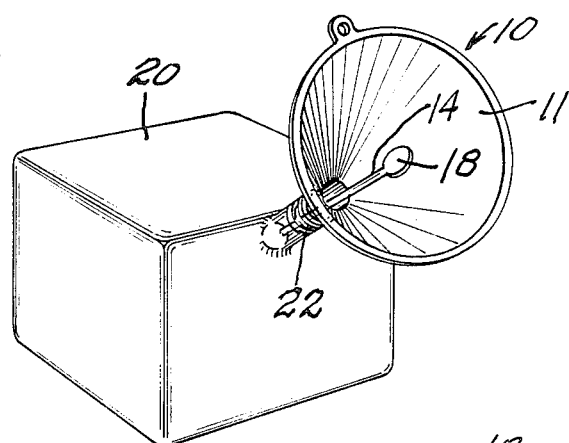
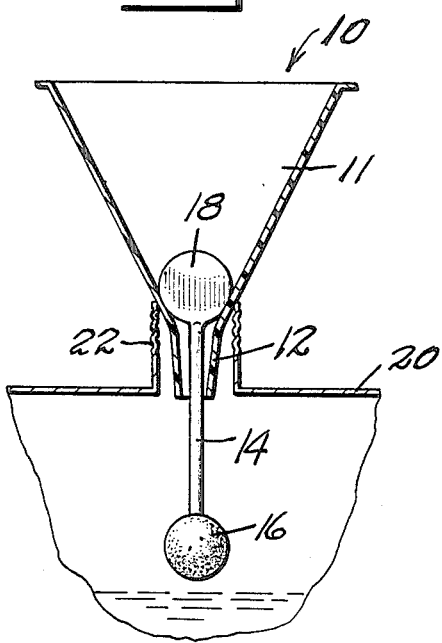
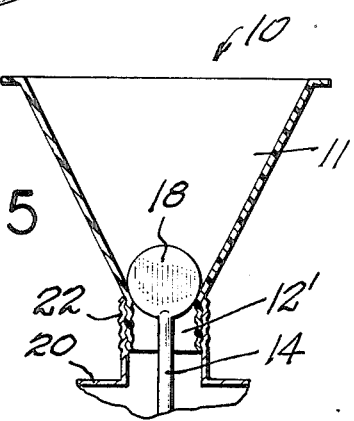
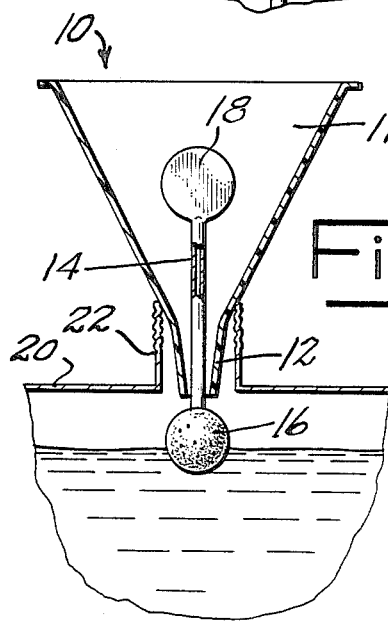

INDICATING LIQUID FUNNEL

SUMMARY OF THE INVENTION

Funnels are widely used while filling liquid containers, as of kerosene heaters, gasoline cans, and lawn mowers, to assist in the prevention of spillage of liquid. The use of funnels does not totally eliminate spillage for various reasons, including overfilling due to lack of knowledge or indication that an excess of liquid over that required to fill the container is being poured through the funnel. Spillage resulting from overfilling with the use of funnels is likely to be damaging or destructive, particularly when fluids such as gasoline, diesel fuel, alcohol and kerosene are involved, such as where the filling occurs at an indoor location as when filling a kerosene heater.

Various efforts to provide funnels with indicators to signal the approach of a filled container condition have been made and various patents upon such proposed devices have been granted, including U.S. Pat. Nos. 953,065; 962,674; 1,243,587; 1,290,968; 1,333,756; 2,689,651; 2,715,488 and 3,630,083. A review of the market indicates that none of these proposed devices has been successfully marketed. Probable reasons for lack of commercial success of prior patented funnels include high cost, lack of dependability of operation, complicated construction, or frictional resistance to indicator movement.

The primary object of this invention is to provide a funnel with an indicator which successfully meets and overcomes the problems and difficulties experienced with prior attempts to provide an indicator in the funnel.

A further object is to provide a device of this character which is simple in construction, inexpensive, and reliable in operation.

Other objects will become apparent upon a reading of the following description.

BRIEF DESCRIPTION OF THE DRAWINGS

FIG. 1 is a cross-sectional view illustrating use of the funnel in filling a container.

FIG. 2 is a perspective view of the funnel and container.

FIG. 3 is an axial sectional view of the funnel in use with the indicator in a rest position.

FIG. 4 is an axial sectional view of the funnel in use, the indicator in indicating position.

FIG. 5 is an axial sectional view of a modified embodiment of the invention.

DESCRIPTION OF THE PREFERRED EMBODIMENT

Referring to the drawing which illustrates the preferred embodiment of the invention, the funnel 10 includes the usual upper frusto conical or tapered portion 11 and a lower tubular discharge portion 12 which preferably may be at least partially tapered. Within the discharge tube 12 is positioned an elongated stem 14, which preferably is rigid and of light weight, for example as formed of a soda fountain straw, and which is of a length substantially greater than the length of discharge tube 12, for example a length approximately three times the length of the discharge tube 12. The outer diameter of the elongated stem 14 is substantially less than the smallest inner diameter of the discharge tube 12, for example a diameter of one-third to one-fifth the inner diameter of discharge tube 12. At its lower or outer end, the stem 14 carries a float or buoyant member 16 which may constitute a hollow plastic sealed member or a closed cell plastic foam member having an uninterrupted surface coating. At its opposite end stem 14 carries an indicator member 18 which is of a size larger than the inner diameter of the small end of the frusto conical funnel body 11. The indicator 18 is preferably of light weight and is so located on the stem that the float end of the stem projects below the discharge end of the funnel tube 12 when the indicator 18 bears upon the inner surface of the funnel, as shown in FIG. 3, and is positioned intermediate the height of the frusto conical funnel body portion 11 as the float approaches the lower discharge end of the tube 12, as shown in FIG. 4.

One important characteristic of the device is that the relation of dimensions of the parts and the shape of the parts including the funnel discharge tube 12 permits use of the funnel to fill a container 20 having an inclined fill opening or neck 22, assuming that the inclination of such fill neck 22 is not such that the lowermost large diameter portion of the funnel body 11 will be near or below the level of the upper portion of the tubular discharge funnel part 12. As liquid is poured through the funnel, the small size or diameter of the stem 14 compared to the smallest inner diameter of the funnel discharge tube 12 permits free endwise movement of the stem float and indicator 18 relative to the funnel part 11 as the float 16 rises with the liquid level in the container being filled. The indicator is readily visible as liquid is poured through the funnel and the user can readily observe the point at which the indicator 18 commences to rise within the funnel body during the filling operation. Also, the taper of the funnel discharge tube, in conjunction with the small diameter of the stem 14, facilitates use of the funnel at a container opening formed at an inclined upper wall of a container being filled. The relation of the size, shape and proportions of the device insures freedom of the movement of the float, its stem and indicator within the funnel and minimizes frictional resistance to float and indicator movement during use, even when the funnel is positioned with its axis inclined.

A modified embodiment of the invention is illustrated in FIG. 5 wherein the lower tubular discharge portion 12' of funnel 10 is threaded for screw thread engagement with the neck portion 22 of container 20. While neck portion 12' is illustrated as fitting within the threaded neck portion 22 of the container, it will be understood that neck portion 12' may be of such size as to accommodate screw threaded engagement with the outer surface of the container neck 22.

While the preferred embodiments of the invention have been illustrated and described, it will be understood that changes in the construction may be made within the scope of the appended claims without departing from the spirit of the invention.

I claim:

1. An indicating liquid funnel comprising a tapered open ended large filling portion and an open ended reduced diameter tubular discharge portion, an indicator unit having an elongated stem portion extending through the discharge portion, a buoyant member of cross-sectional size larger than the diameter of said discharge portion carried by said stem and projecting externally from said discharge portion, and a light weight indicating portion of a size larger than said discharge portion carried by said stem and adapted to seat within the filling portion of the funnel, said stem being of a length positioning said buoyant member spaced from the end of the funnel discharge portion when said indicating portion engages the filling portion of the funnel and being of a traverse dimension not greater than one-half the inner diameter of said funnel discharge portion, said indicating portion being of a shape to permit flow of liquid therepast when engaging the filling portion of said funnel and moving visibly when said buoyant member floats toward said discharge portion during a liquid filling operation.

2. An indicating liquid funnel as defined in claim 1, wherein said indicator stem portion is formed of light weight tubular material.

3. An indicating liquid funnel as defined in claim 2, wherein said buoyant member is a sealed light weight hollow member.

4. An indicating liquid funnel as defined in claim 2, wherein said buoyant member is a closed cell plastic foam member having a sealing coating.

5. An indicating liquid funnel as defined in claim 1, wherein said indicating portion has a rounded lower funnel-engaging surface.

6. An indicating liquid funnel as defined in claim 1, wherein said discharge portion is screw threaded for releasable connection with the filling neck of a container to be filled.

* * * * *